Patented Dec. 26, 1939

2,185,129

UNITED STATES PATENT OFFICE 2,185,129

PROCESS FOR DEHYDRATING COMMINUTED POTATOES AND ROOT CROPS

Karl Maus, Berlin, Germany

No Drawing. Application June 3, 1938, Serial No. 211,689. In Germany February 7, 1935

6 Claims. (Cl. 99—207)

Applications have been filed in Germany February 7, 1935, February 19, 1936, and April 19, 1938.

It is known that by the stacking of the harvested potatoes and root crops (e. g., turnips, beets, carrots) a part of these agricultural products is annually spoiled according to weather conditions owing to the high water content of the same. The most varied proposals have already been made for meeting this drawback, which however did not achieve the desired result partly on account of their troublesome nature and partly also on account of their being uneconomical.

For example, it has already been proposed to press the cut up potatoes under strong pressure and to dry the pressed cakes, stacked up in closed chambers with provision of air spaces, with the aid of dried air so as to be ready for further use. The advantage of this method was supposed to lie in the fact that large masses can be handled and that no starch is lost. Practical experiments have shown however that only a little water can be pressed off from potatoes which have been cut into slices.

A further proposal is to press the water off from the raw potatoes and to allow the water so expressed to be sucked up by semi- or wholly dried dry substances. The starch carried into the expressed water of the crop is in this way recovered again.

According to this proposal, when working up 100 kg. of raw potatoes with a water content of 75%, the press effect being 50%=38 kg., at least 38 kg. of dry material must be mixed with the expressed water from the root crop, so that then both the pressed product and the mixed material possess a water content of 50%, which is much too high for a storable article.

It is also known to admix with the comminuted raw potatoes just so much water-binding dry substance that even at a pressing pressure of 200 atmospheres no further water can be expressed, a mixing ratio of 1:1 being advised.

The practical employment of this method would mean that for dehydrating 50 kg. of raw potatoes the dry substance of a further 150 kg. of raw potatoes would be required.

A further pressing process consists in this that the crops are comminuted and the small pieces, coated with dust, are subjected to the pressing operation, the dust used for the coating of the small pieces penetrating into the interior of the mixed material, forming channels there and facilitating the flowing off of water from the interior of the pressed cake.

The essence of the present invention consists in this that the comminuted crop products (e. g., potatoes, carrots, beets, turnips) are arranged in several superposed layers in press chambers, the surfaces of which are strewn with small quantities of ground adsorbents, having an emulgent action (dry material of the same kind, hay meal, barley chaff, husks or chaff), and that the surface of the several layers is strewn with small quantities of said adsorbents and thereupon the material is pressed to remove water. The new method can be used not only for working up large quantities of raw potatoes to cheap feeding stuffs, but owing to its simplicity can be very usefully employed both in portable plants for small agricultural undertakings as well as in stationary plants for the production of products for human nutrition.

Practical experiments have shown that in the dehydrating of potatoes, root crops or the like, actually not such large quantities of addition material are necessary as has heretofore been assumed, and further that no special mixing operation is necessary to secure satisfactory efficiency in the dehydration, but that according to the invention a very small quantity of dry material of 5 to 7% of the material to be dehydrated suffices to cause up to ⅘ of the crop water contained in the raw potatoes to run off.

In the process according to the present invention this efficiency is attained by the action of the dry substance with emulgent action being combined with the press action, and both actions being utilized together for dehydrating the material to an enhanced degree.

A further advantage of the process of the present invention is that with such an extensive flowing off of the crop water the potato starch and plant fibre contained in the press product, owing to their water repelling property, can be very rapidly and readily after-dried to the water content necessary for the end product.

In carrying out the process according to the present invention the raw potatoes or the like are first of all washed and, according to their manner of use, comminuted either peeled or unpeeled. Corresponding to the cross-section of the press chamber, the quantity intended for each press cake is so measured that the depth of material is as low as possible.

This quantity is charged into the press chamber which has been dusted out or strewn over, either by hand or mechanically, with the substances of emulgent action, more particularly meal-like dried potatoes, dried root crops, chaff or the like, in quantities of about 5-7% of the mass being dehydrated, and then these substances likewise are dusted over or strewn on the surface. By inserting a press chamber wall which is freely movable in itself the press chamber filled in this way is thereupon closed. The now newly formed press chamber is again dusted over or strewn with substances of emulgent action and is charged with an equally large quantity of comminuted potatoes or the like. This working operation is repeated corresponding to the height of the press chamber. Referring to the quantity of potato for one cake, 5 to 7% of dry material of preferably the same origin (e. g., potato flour when pressing potatoes) are used for dusting or strewing over the press chamber surfaces. The quantities so layered above one another are pressed together at a pressure of about 100 atmospheres, thereby very extensively dehydrated and then further worked. The product obtained from the unpeeled potatoes is ground to coarse potato grains, and the product obtained from peeled potatoes is ground to double fine potato grains or potato powder, and simultaneously dried ready for further purposes.

By the manner of working according to the present invention it is ensured that in the pressing operation, according to the nature of the potato up to ⅘ of the water contained in the potatoes are removed and from raw potatoes with about 77% water content a pressed product is obtained having about 33% water content.

With the pressing process of the present invention therefore large quantities of dry substance of the same origin are not mixed with the raw potatoes or root crops and the water then vaporized from the larger quantity; on the contrary, one is able, with employment of very small quantities of dry substance, to cause by far the greater part of the water of the crop to flow off in a simple, cheap and convenient manner, whilst the remaining part of the water, in so far as the same does not belong to the commercial article, is caused to vaporize in a grinding and drying plant combined with the press device.

Example

Raw potatoes with about 77% water were used and an adsorbent with 16% water.

Comminuted raw potatoes:
100 kg. = 77 kg. water + 23 kg. dry substance
Adsorbent:
5 kg. = 0.8 kg. water + 4.2 kg. dry substance
105 kg. = 77.8 kg. water + 27.2 kg. dry substance After pressing at about 100 atmospheres 38 kg. of pressed material are obtained consisting of 27.2 kg. of dry substance and 10.8 kg. of water. Of the 77.8 kg. of water from the crop about 67 kg. = 86% have therefore been removed by pressing.

As adsorbent in the working up of raw potatoes and root crops in addition to adsorbents of the same origin, hay meal, barley chaff (barley husks), chaff or similar substances may also be used.

The pressed material so obtained is dried ready for further purposes in an annexed grinding and drying process.

The potato starch, as well as the vegetable fibres, are still contained in the raw state, although dehydrated and dried, in the potato meal or grains obtained according to this process. As is well known potato starch in the raw state is not very digestible in the stomachs of pigs. In order to make potato grains which are readily digestible and are always ready for utilisation for fodder purposes, according to one form of procedure provided by the present invention the potato starch is bound to other substances of animal or vegetable origin.

As such substances may be used blood-, meat-, bone-, as well as fish-meal, or also hay meal, barley chaff (barley husks) and the like.

It is essential in this connection that in the dehydrating operation large quantities of water in the crop are caused to flow off, the starch, however, remaining in the pressed material in a state such that the binding thereof is ensured according to the nature of the substances being admixed.

In the practical prosecution of this mode of carrying out the process the following has been found: If hay meal is added before the first pressing operation to the raw comminuted potatoes not dehydrated previously, then a badly smelling inferior feeding stuff is obtained; if on the other hand the hay meal is added to the previously dehydrated and comminuted pressed product and working up is effected in a second pressing operation, then a very highly valuable fodder is obtained, which is particularly suitable also for dairy farming purposes.

In working up raw potatoes of low starch value, somewhat high water content and somewhat high content of vegetable fibre, preferably substances of animal origin are employed for the dry substance addition; when working up potatoes of fairly high starch value and fairly low vegetable fibre content then on the other hand preferably addition substances are used which are rich in vegetable fibre as the dry substance addition, such as barley chaff or husks or hay meal and the like.

The manner of working for producing coarse potato grains is the following: raw potatoes having a starch content of about 14% are preliminarily dehydrated down to about 35% in the above described manner, that is to say with employment of small quantities of adsorbents having an emulgent action; the pressed material is comminuted and then about 3-5% of meat-, blood-, bone- or fish-meal, referred to the quantity of pressed material, are added to it. Finally the mixture is pressed again.

When using addition substances which are rich in vegetable fibre, such as barley chaff or husks and hay meal, and raw potatoes with a starch content of 16% and more, the raw potatoes are preliminarily dehydrated in the same way but down to about 40% water; the pressed material is comminuted and then 5-7% barley chaff or husks or hay meal, referred to the quantity of pressed material, are added to it. Finally the mixture is pressed again. In this working operation the starch is then bound to the added substances.

When utilising these products as fodder, the nutrient substances are supplied to the stomach of the animal without preliminary preparation of the fodder in the compounding which is economically necessary for the particular purpose for which the fodder is being given.

In order to obtain a softer end product during the pressing and at the same time to prevent the undesired colouration of the end product which arises on fairly long storage, it is advisable to treat the comminuted crop fruits before pressing with a chemical substance which prevents fermentation. The substance may be liquid or in the form of dust. The treatment is preferably effected in intervals. The comminuted fruits are sprayed with this substance or dusted over with it. This mode of carrying out the process also offers the advantage that the fermentation of the pressed-off fruit or crop water is prevented, and that the flocculation out of fruit water is facilitated.

Practical experiments have shown that small quantities of hydrogen peroxide or $H_2SO_3$, which are employed at the beginning of the comminution of the raw potatoes, not only extensively prevent this fermentation but substantially facilitate the splitting off of the nutrient substances carried into the pressed-off fruit water.

In this connection it was further ascertained that the product so obtained, corresponding to the percentage of the chemical substance employed for preventing fermentation, was a correspondingly softer product, which is very important for the production of feeding stuffs from potatoes. By this chemical pretreatment the raw starch is degraded in the subsequent pressing process, converted into readily digestible carbohydrates, and in this state, as ascertained from fodder consumption experiments already carried out, is obtainable ready for utilisation as fodder even for young pigs.

The advantages of a pretreatment of this kind are apparent economically therefore not only in the prevention of fermentation of the comminuted potatoes, in the enhancement of the pressing effect in the dehydration operation and in the preparatory flocculation of the pressed-off fruit or crop water, but also in addition in the fodder preparation, as well as in the utility value of the fodder quantity.

The manner of working is for example the following: the washed potatoes arrive at a comminuting device. The small pieces of potato are finely dusted over, or sprayed with, the chemical substance. The small pieces of potato treated in this way then reach a storage container from which the excess fruit or crop water liberated during the comminuting can run off, whilst the settled mass is passed to the dehydrating press.

I claim:

1. A process for preparing dehydrated comminuted root crops comprising comminuting the root crop material, forming a plurality of layers of the comminuted material in superimposed relation, sprinkling on the surface of each layer a quantity of ground edible adsorbent material having an emulgent action, the quantity being from 5 to 7% of the material of the layer and finally pressing the composite layers to remove water therefrom.

2. A process as claimed in claim 1 and further comprising comminuting the pressed material, mixing therewith 3 to 7% of a starch binding fodder substance to improve the digestibility of the final product and then pressing the mixture.

3. A process as claimed in claim 1 and further comprising the step of intermittently treating the comminuted material with $SO_2$ to prevent fermentation.

4. A process as claimed in claim 1 and further comprising the step of intermittently treating the comminuted material with $H_2O_2$ to prevent fermentation.

5. A process as claimed in claim 1 and further comprising the steps of intermittently treating the comminuted material with $SO_2$ to prevent fermentation, comminuting the pressed material, mixing therewith 3 to 7% of a starch binding fodder substance to improve the digestibility of the final product and then pressing the mixture.

6. A process as claimed in claim 1 and further comprising the steps of intermittently treating the comminuted material with $SO_2$ to prevent fermentation, collecting the expressed water separating the water from the nutritious substances which have settled out and adding the nutriticus substances to the pressed material.

KARL MAUS.